US008566570B2

(12) United States Patent
Housty

(10) Patent No.: US 8,566,570 B2
(45) Date of Patent: *Oct. 22, 2013

(54) DISTRIBUTED MULTI-CORE MEMORY INITIALIZATION

(71) Applicant: Advanced Micro Devices, Inc., Sunnyvale, CA (US)

(72) Inventor: Oswin E. Housty, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,648

(22) Filed: Oct. 10, 2012

(65) Prior Publication Data
US 2013/0042096 A1 Feb. 14, 2013

Related U.S. Application Data

(63) Continuation of application No. 12/624,626, filed on Nov. 24, 2009, now Pat. No. 8,307,198.

(51) Int. Cl.
| | | |
|---|---|---|
| G06F 9/00 | (2006.01) | |
| G06F 15/16 | (2006.01) | |
| G06F 15/167 | (2006.01) | |
| G06F 12/00 | (2006.01) | |
| G06F 15/00 | (2006.01) | |
| G06F 9/46 | (2006.01) | |
| G11C 29/00 | (2006.01) | |

(52) U.S. Cl.
USPC ............... 713/1; 713/2; 709/208; 709/213; 711/104; 711/114; 711/147; 711/170; 712/23; 712/28; 712/32; 714/718; 718/102

(58) Field of Classification Search
USPC ........... 713/1, 2; 709/208, 213; 711/104, 114, 711/147, 170; 712/23, 28, 32; 718/102
See application file for complete search history.

(56) References Cited

U.S. PATENT DOCUMENTS

| | | | |
|---|---|---|---|
| 5,673,388 A | 9/1997 | Murthi et al. | |
| 5,768,585 A | 6/1998 | Tetrick et al. | |
| 6,158,000 A | 12/2000 | Collins | |
| 6,336,185 B1 * | 1/2002 | Sargenti et al. | 713/2 |
| 6,766,474 B2 * | 7/2004 | Schelling | 714/36 |
| 7,065,688 B1 | 6/2006 | Moyes et al. | |

(Continued)

FOREIGN PATENT DOCUMENTS

WO WO0017750 A1 3/2000

OTHER PUBLICATIONS

International Preliminary Report on Patentability for PCT Patent Application No. PCT/US2010/057561, mailed May 30, 2012.

(Continued)

*Primary Examiner* — Stefan Stoynov
(74) *Attorney, Agent, or Firm* — Terrile, Cannatti, Chambers & Holland, LLP; Michael Rocco Cannatti

(57) ABSTRACT

In a system having a plurality of processing nodes, a control node divides a task into a plurality of sub-tasks, and assigns the sub-tasks to one or more additional processing nodes which execute the assigned sub-tasks and return the results to the control node, thereby enabling a plurality of processing nodes to efficiently and quickly perform memory initialization and test of all assigned sub-tasks.

16 Claims, 4 Drawing Sheets

(56) References Cited

U.S. PATENT DOCUMENTS

| | | |
|---|---|---|
| 7,194,660 B2 | 3/2007 | Edrich |
| 7,251,744 B1 | 7/2007 | Housty |
| 7,526,639 B2 | 4/2009 | Duron et al. |
| 8,181,072 B2 * | 5/2012 | Dohji et al. .................. 714/718 |
| 2005/0071580 A1 * | 3/2005 | LeClerg et al. ............... 711/154 |
| 2006/0149959 A1 | 7/2006 | Rothman et al. |
| 2008/0162878 A1 | 7/2008 | Zimmer et al. |
| 2009/0193175 A1 | 7/2009 | Housty |

OTHER PUBLICATIONS

PCT International Search Report for PCT Patent Application No. PCT/US2010/057561, mailed Mar. 4, 2011.

* cited by examiner

DISTRIBUTED MULTI-CORE MEMORY INITIALIZATION

BACKGROUND OF THE INVENTION

1. Field of the Invention

The present invention relates in general to the data processing systems. In one aspect, the present invention relates to a method and apparatus for memory initialization during system boot.

2. Description of the Related Art

Data processing or computing systems are designed to give independent computing power to one or more users, and can be found in many forms including, for example, mainframes, minicomputers, workstations, servers, personal computers, internet terminals, notebooks and embedded systems. In general, computer system architectures are designed to include provide one or more microprocessor cores with high speed, high bandwidth access to selected system components, associated memory and control logic (typically on a system board) and a number of peripheral devices that provide input and/or output (I/O) for the system. For example, FIG. 1 illustrates an example architecture for a conventional computer system 100. The computer system 100 includes one or more processors 102 connected across a "north" bridge 104 to a system memory 108. Typically, the memory array 108 includes one or more memory modules, and may also include memory slots for the addition or replacement of memory modules. The north bridge circuit 104 can be programmed to interface to a variety of memory modules, and as illustrated, the north bridge circuit 104 is shared among a plurality of memory modules 108. As a result, if differing memory modules are populated, the north bridge circuit 104 must be programmed with parameters that allow each memory module to operate correctly. The depicted north bridge circuit 104 is connected over a high-speed, high-bandwidth bus (e.g., a memory bus 107) to the memory 108, and is also connected over a high-speed, high-bandwidth bus (e.g., an Alink or PCI bus) to a "south" bridge 112. The "south" bridge 112 is connected to one or more I/O devices, such as a Peripheral Component Interconnect (PCI) bus 110 (which in turn is connected to a network interface card (NIC) 120), a serial AT Attachment (SATA) interface 114, a universal serial bus (USB) interface 116, and a Low Pin Count (LPC) bus 118 (which in turn is connected to a super input/output controller chip (SuperI/O) 122 and BIOS memory 124). As will be appreciated, it will be appreciated that other buses, devices, and/or subsystems may be included in the computer system 100 as desired, such as caches, modems, parallel or serial interfaces, SCSI interfaces, etc. Also, the north bridge 104 and the south bridge 112 may be implemented with a single chip or a plurality of chips, leading to the collective term "chipset". Alternatively, all or some of the functionality of the bridge chips may be present within processor 102.

Computer systems typically include a set of built-in software routines called the basic input/output system (BIOS) which provides a software interface between the system hardware and the operating system software so that the programmer and user can interact with the system hardware. The BIOS instructions are stored in non-volatile memory 124 (e.g., ROM (Read Only Memory), PROM (Programmable ROM), EPROM (Erasable PROM), EEPROM (Electrically Erasable PROM), flash RAM (Random Access Memory), or the like), and are used to control important computer system functions at power up, including testing and initializing memory, inventorying and initializing the system, and testing the system. These functions at power up are referred to as "system boot" or "booting the system" and can occur every time the system powers up or is reset. In the conventional computer system 100 shown in FIG. 1, the BIOS executes on one of the processors 102, referred to as the boot strap processor, to boot the computing system 100. In operation, the boot strap processor 102 communicates through north bridge 104 to the memory array 108. The north bridge circuit 104 includes a memory controller 106 that is connected to one or more channel controllers that interface with the memory bus 107, such as a double data rate (DDR) bus. The north bridge circuit 104 also communicates with one or more south bridges 112 on a standard bus 109, for example, a peripheral component interconnect (PCI) bus. South bridge 112 communicates to one or more input/output (I/O) devices 120, 122, 124, though additional or fewer devices (not shown) can be attached to the south bridge 112.

Upon system initialization, the boot strap processor 102 performs all memory testing and clearing during system boot which can take a significant amount of time. Large server systems often take several minutes to boot while the other processors are idle. In the depicted example, the BIOS executing on the boot strap processor initializes the memory controller 106 north bridge circuit 104 by programming registers from the boot strap processor 102 based on information from the DIMM memory 108 on the DDR memory bus 107. Memory initialization can include verifying population of memory modules, verifying proper operation of the memory (no stuck bits), and initializing or clearing the memory to known values. With large memory 108 (e.g., 8, 16, or 32 Gigabytes of memory), conventional systems can take several minutes to initialize the memory, especially where the "DDR training" processes use the boot strap processor 102 to initialize memory by consecutively executing an ordered sequence of memory initialization tasks without regard to dependency between tasks. This delay is exacerbated when there are large amounts of memory 108 attached to each controller 106.

Accordingly, a need exists for an improved memory initialization device, methodology and system which addresses various problems in the art that have been discovered by the above-named inventors where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

SUMMARY OF EMBODIMENTS OF THE INVENTION

Broadly speaking, embodiments of the present invention provide a system, method and apparatus for initializing memory in a multi-core computer system by distributing memory initialization tasks across the cores such that execution can be achieved out of order and without dependencies on previous tasks. In selected embodiments, a system is provided which includes a plurality of processing nodes or cores and a plurality of system memory components. In selected embodiments, one of the processing nodes or cores is selected to provide a control node/core function for dividing memory initialization tasks into individual sub-tasks that are processed by the multiple CPU nodes/cores. The individual sub-tasks are sent or distributed to other "slave" cores for execution. At each slave core, the sub-tasks are scheduled for execution when the slave core has the resources to process the sub-task(s). As a result, the time of execution of a given sub-task at a given slave core may or may not overlap with the execution of other sub-tasks at other slave cores. As a result, it is possible that the slave cores execute the sub-tasks in parallel or in serial. After the sub-tasks are processed, they are recombined by the control core to complete the original task. This will allow concurrent task execution resulting in decreased overall execution time and optimal performance since it is possible that the slave cores execute the sub-tasks in parallel.

In accordance with various embodiments of the present invention, a method is provided for causing a plurality of processing nodes to perform a boot process task, such as a memory initialization task. In an exemplary embodiment of the method, a control processing node divides a boot process task (e.g., memory initialization task) into a plurality of boot process sub-tasks (e.g., memory initialization sub-tasks) and then distributes the sub-tasks amongst a plurality of processing nodes, which may include the control processing node, so that each sub-task has a corresponding processing node. Prior to distributing the sub-tasks, the control processing node initializes communication links between the plurality of processing nodes. To provide an example of the sub-task distribution, one of the processing nodes may be assigned a memory initialization sub-task of reading a serial presence detect (SPD) value from a DIMM memory, while another of the processing nodes is assigned a memory initialization sub-task of executing complex initialization tasks that do not depend on the SPD value. Each memory initialization sub-task is scheduled for execution and then executed at the corresponding processing node to generate a sub-task result. In selected embodiments, a software routine is used to execute the memory initialization sub-task at the corresponding processing node. The control processing node receives status reports concerning the execution of the memory initialization sub-tasks at the corresponding processing nodes, and the sub-task results from the plurality of processing nodes are then combined at the control processing node, wherein the plurality of memory initialization sub-tasks may be executed in parallel or in sequence at the plurality of processing nodes. For example, one of the processing nodes can execute its assigned memory initialization sub-task in parallel with another processing node which executes its corresponding memory initialization sub-task.

In other embodiments, a computer system is provided which includes a system memory (e.g., a DIMM-based array) and a plurality of processing nodes, where each processing node includes a processor core, a communication interface to the other processing node(s), and a memory controller for managing data flow to and from the system memory. One of the processing nodes is a master processing node that is configured to perform a memory initialization task on the system memory by dividing the memory initialization task into memory initialization sub-tasks and assigning the memory initialization sub-tasks to one or more execution processing nodes (which may include the master processing node) so that each assigned memory initialization sub-task has a corresponding execution processing node. Each execution processing node is configured to execute each memory initialization sub-task assigned to it by the master processing node and to generate therefrom a sub-task result. The master processing node is configured to receive status of the memory initialization sub-tasks from the execution processing nodes and to combine sub-task results from the execution processing node(s) to perform the memory initialization task by programming one or more registers in the memory controller of the master processing node based on results from executing the plurality of memory initialization sub-tasks at the execution processing node(s). In selected embodiments, the master processing node divides and assigns memory initialization sub-tasks so that memory initialization sub-tasks assigned to one of the execution processing nodes can be executed out of order without dependency on other memory initialization sub-tasks assigned to another execution processing nodes. In this way, a first execution processing node can execute its memory initialization sub-task in parallel with another of the execution processing node(s) executing its corresponding memory initialization sub-task so that the plurality of memory initialization sub-tasks may be executed in parallel or in sequence at the execution processing nodes.

In yet other embodiments, a computer system is provided which includes a memory array and a plurality of processing nodes. The memory array may be implemented as a plurality of dual inline memory modules connected over a double data rate (DDR) bus to the plurality of processing nodes. Each processing node may be implemented as a processor, a memory controller for communicating with the memory array, and a communication interface to at least one other of the plurality of processing nodes. In operation, a first processing node divides a memory initialization task into a plurality of sub-tasks and assigns the plurality of sub-tasks to the processing nodes. Each processing node can obtain information from any portion of the memory array while executing assigned sub-tasks. In addition, each processing node returns sub-task execution results to the first processing nodes, thereby enabling the plurality of processing nodes to efficiently and quickly perform memory initialization of the memory array. In this way, the first processing node is configured to perform the memory initialization task by programming one or more registers its memory controller based on results from executing the plurality of sub-tasks at the processing nodes, thereby reducing boot time requirements as compared to how much time would be required to boot by executing the memory initialization task at only one of the processing nodes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
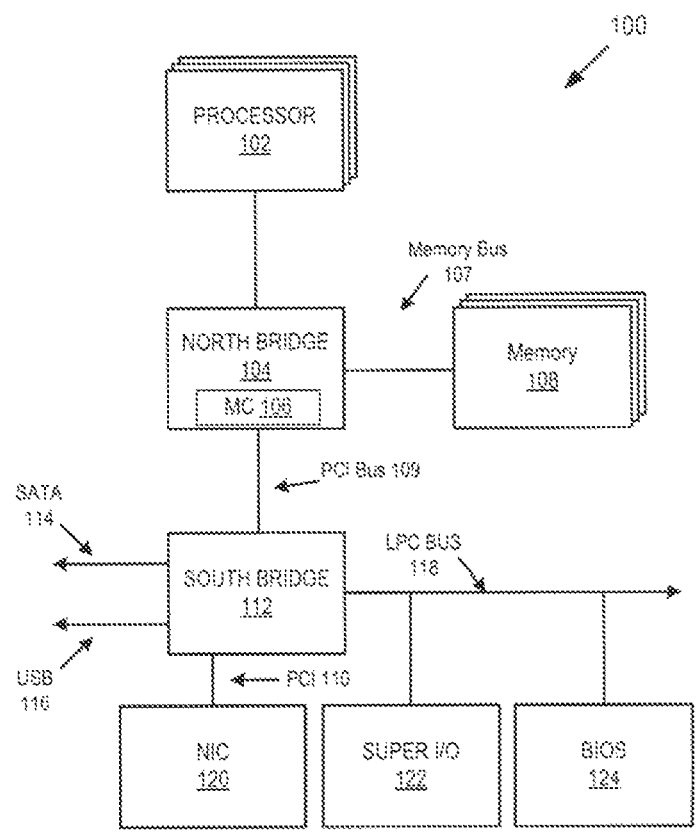
FIG. 1 illustrates a simplified architectural block diagram of a multi-core computer system.

A distributed multi-core memory test and initialization method and apparatus are provided for dividing memory initialization tasks into sub-tasks under control of a master core. The master core then sends or distributes the sub-tasks for separate execution by the multiple cores, and upon completion, the results are sent back to the master core for recombination to complete the original task. By distributing memory initialization tasks to separate cores, execution of sub-tasks can be achieved out of order and without dependencies on previous tasks. This distributed execution allows some tasks to be completed out of sequence without waiting for previous sub-tasks to be completed, thereby improving device performance by reducing the length of time required for memory initialization time.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
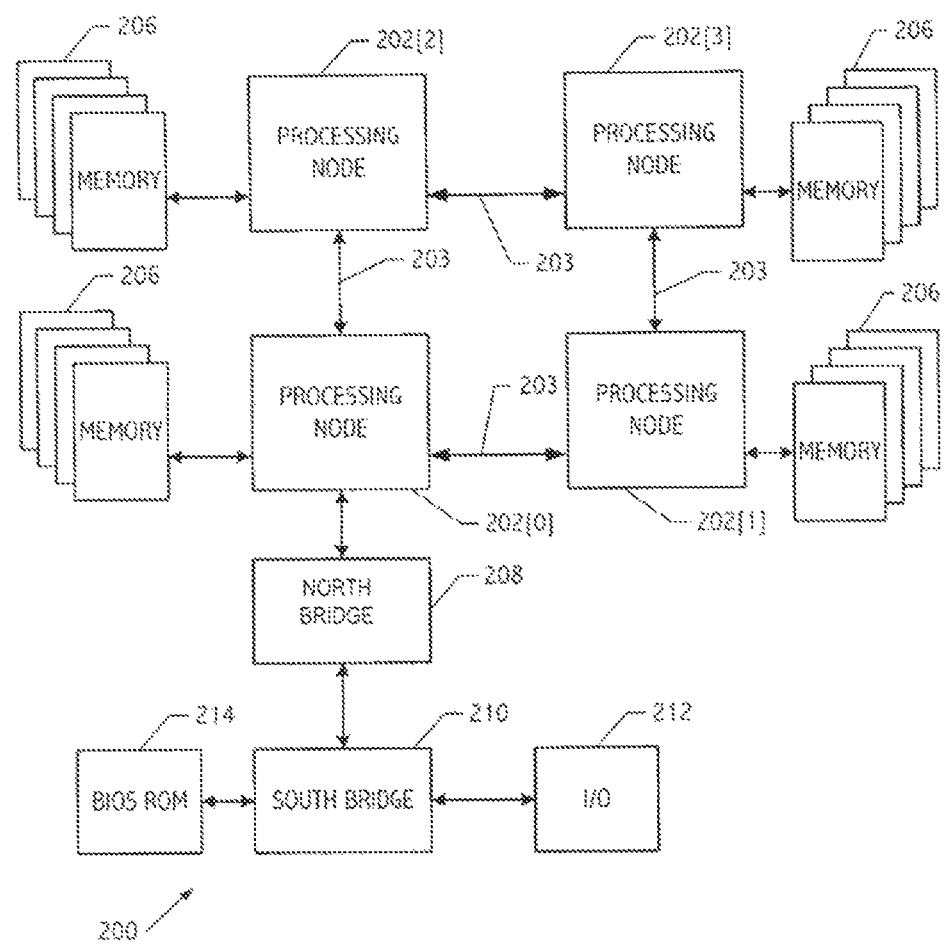
FIG. 2 illustrates a computing system architecture with distributed multi-core memory initialization in accordance with selected embodiments of the present invention.

Referring now to FIG. 2, there is shown a computing system architecture 200 with distributed multi-core memory initialization in accordance with selected embodiments of the present invention. In the depicted computing system 200, there are a plurality of processing nodes 202[0:3] that communicate with each other via links 203. Each processing node 202 includes, for example, a processor core, a memory controller, and link interface circuitry. Links 203 can be dual point to point links according to, for example, a split-transaction bus protocol such as the HyperTransport (HT) protocol. Links 203 can include a downstream data flow and an upstream data flow. Link signals typically include link traffic such as clock, control, command, address and data information and link sideband signals that qualify and synchronize the traffic flowing between devices. Each memory controller of processing nodes 202 communicates to a corresponding memory array 206[0:3]. The processing nodes 202 and memory arrays 206 are in a "coherent" portion of the system, where all memory transactions are coherent. A north bridge device can be included in one or more of the processing nodes 202, or can be provided as a separate north bridge device 208 that is coupled to one of the processing nodes 202 via another HT link. In either case, the north bridge device can be coupled to a south bridge 210 via another HT link. In addition, one or more I/O devices 212 can be coupled to south bridge 210. BIOS ROM 214 can be coupled to south bridge 210. North bridge 208, south bridge 210 and I/O devices 212 are in a "non-coherent" portion of the system.

Each memory array 206 can consist of several memory slots, populated or unpopulated, for the addition or replacement of memory modules. For example, in a server system 200, each memory slot can provide 512 Megabytes (Mbytes) of storage capability so that the total server system 200 has a large memory, for example 32 Gigabytes (GBytes) of storage capability. The memory controller of each processing node 202 can be programmed differently, but must be programmed to interface to the local variety of memory modules 206 coupled to the associated processing node 202. It will be appreciated that the system 200 can be more complex than shown. For example, there can be additional processing nodes 202 in the coherent portion of the system. And although processing nodes 202 are illustrated in a ladder architecture, processing nodes 202 can be interconnected in a variety of ways and can have more complex couplings to one another via additional HT link(s).

Figure 3:
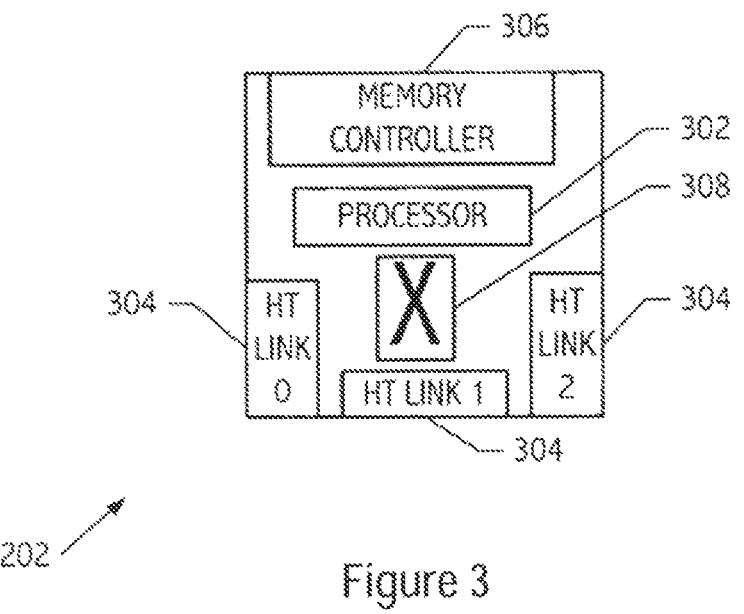
FIG. 3 illustrates an exemplary processing node in accordance with selected embodiments of the present invention.

FIG. 3 illustrates an exemplary processing node 202 in accordance with selected embodiments of the present invention. As illustrated, processing node 202 includes a processor core 302, multiple HT link interfaces 304, and a memory controller 306. The processor core 302 executes the code instructions for the memory initialization and testing tasks performed by the processor node. For example, if the processor node serves as the control or master node, then the processor core 302 executes the code instructions for dividing the memory initialization and testing tasks into a plurality of sub-tasks which are assigned and distributed to the other processor nodes. Alternatively, if the processor node serves as one of the execution or slave nodes, then the processor core 302 executes the code instructions for obtaining, scheduling, and executing the assigned memory initialization and testing sub-tasks and returning the results to the control/master node. A crossbar 308 transfers requests, responses and broadcast messages to processor 302 and/or the appropriate HT link interface(s) 304. Transfer of the requests, responses and broadcast messages is directed by multiple configuration routing tables located in each processing node 202 that must be configured by BIOS. Additionally, memory controller 306 contains multiple configuration registers for operational parameters that must be programmed by BIOS.

Figure 4:
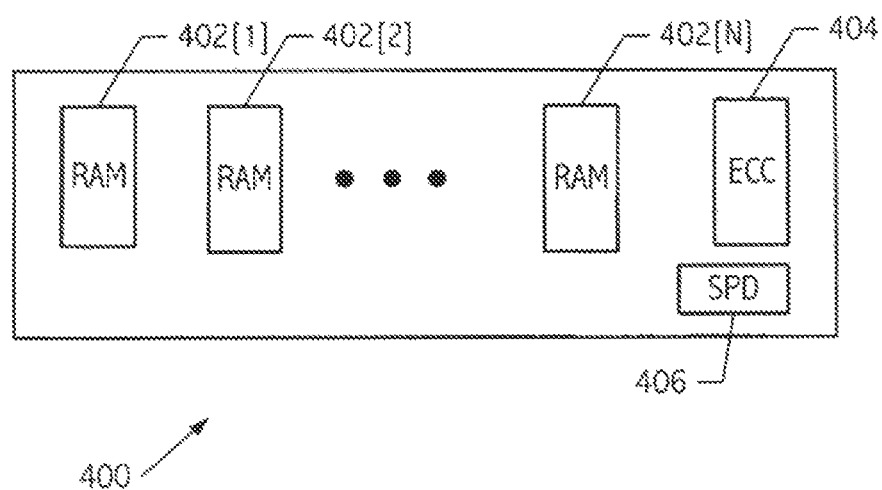
FIG. 4 illustrates an exemplary DIMM (dual inline memory module).

FIG. 4 illustrates an exemplary DIMM (dual inline memory module) 400. As will be appreciated, several DIMMs, typically eight, can make up a memory array 206, where each DIMM 400 contains multiple random access memory (RAM) integrated circuits or chips 402[1:N], such as DDR (double data rate) memory chips. Additionally, DIMM 400 can have an ECC (error correction code) circuitry 404. ECC circuitry 404 stores error correction codes that allow memory errors to be found and corrected. Additionally, DIMM 400 can have an SPD (serial presence detect) circuit 406. SPD circuitry 406 contains read only information specifying an operational range of DIMM 400 and other information similar to what one would find in a data sheet. For example, SPD circuitry 406 identifies memory storage capacity of DIMM 400, operating parameters such as minimum cycle times, CAS latency, and the like.

Upon system initialization, each memory module 206 must be initialized and tested. This can include verifying population of memory modules, verifying proper operation of the memory (no stuck bits), and initializing or clearing the memory to known values. Each memory module can be scrubbed on a periodic basis utilizing ECC to correct any memory errors.

Figure 5:
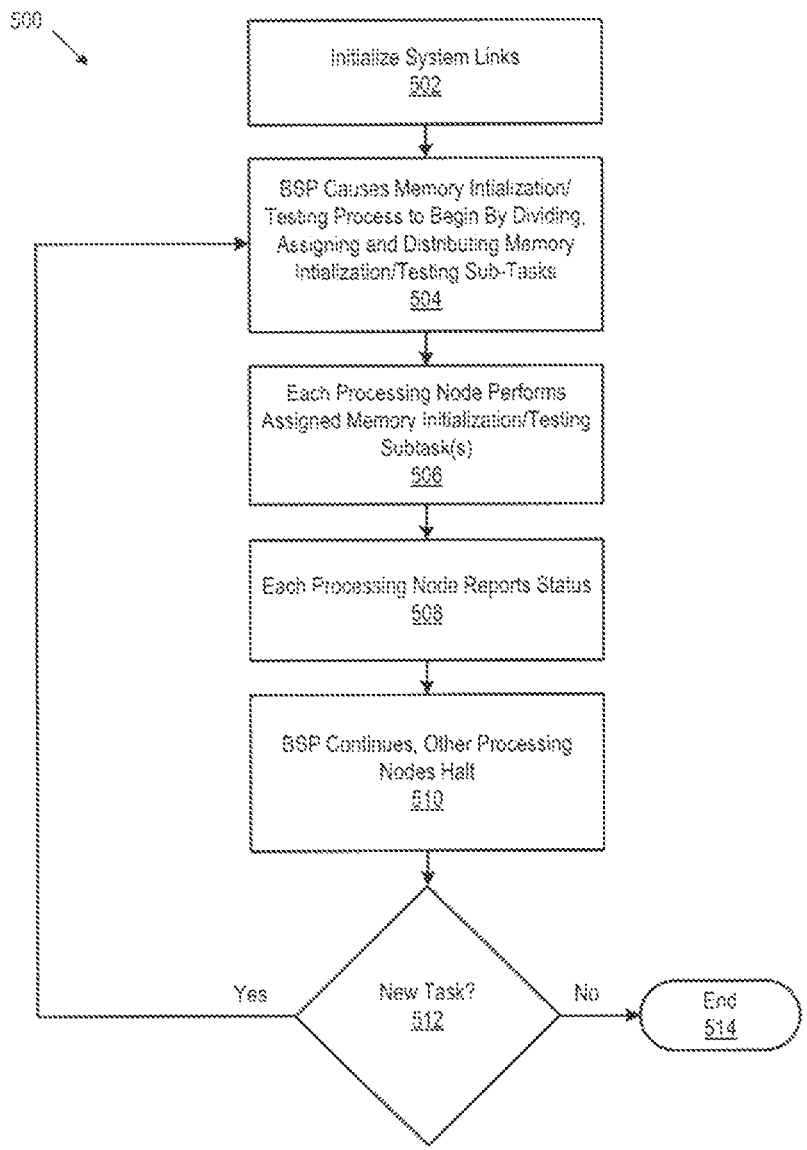
FIG. 5 illustrates a flow diagram of optimized memory initialization and testing in accordance with selected embodiments of the present invention.

FIG. 5 illustrates a flow diagram of optimized memory initialization and testing sequence 500 in accordance with selected embodiments of the present invention. The sequence begins at step 502 by initializing system links such that each processing node can communicate to other processing nodes and memory. This is typically performed by BIOS running on the boot strap processor. Alternatively, in hardwired systems, the processing nodes can be automatically configured to communicate to each other and memory upon system power up.

At step 504, the processing node designated as the boot strap processor (BSP) causes the memory initialization and/or testing process to begin by dividing the memory initialization/testing task into a plurality of sub-tasks, and then assigning and distributing each sub-task to an execution processing node. For example, the BSP can send a start message, along with the assigned sub-tasks, to each processing node. In addition or in the alternative, a bit can be written in each processing node indicating the memory initialization and testing process is to begin so that the assigned sub-tasks can be delivered by the BSP or retrieved by the execution processing node(s). Alternatively, a directed interrupt can cause the process to begin, such as when code executing on an arbitrary processor writes to one or more registers. The values written can direct one or more processors to take a specific action on its assigned sub-tasks. For example, the value written can include a node identifier that identifies the target of the directed interrupt and a vector that indicates a series of instructions and sub-tasks to execute via specifying directly or indirectly an address at which to begin code execution. If needed, a hardware mechanism can deliver the start message to the target processor to prompt the targeted processor to begin execution of the assigned sub-tasks specified by the vector.

At step 506, each processing node 202 performs its assigned memory initialization and testing sub-tasks which may or may not correspond to the associated memory 206. In an example implementation shown in FIG. 2, the computing system 200 includes four cores, a control core 202[0] and three slave cores 202[1:3]. The memory initialization/testing task is divided by the control core 202[0] into a plurality of sub-tasks (e.g., sub-task1, sub-task2, sub-task3, etc.). The control core 202[0] sends sub-task1 to a first slave core 202[1], sub-task2 to a second slave core 202[2], and sub-task3 to a third slave core 202[3]. At step 504, each slave core 202[1:3] receives its sub-tasks and schedules it for execution. In addition, the control core 202[0] may continue execution of a different sub-task or may wait for execution to complete on slave cores or may execute a separate sub-task itself Each slave core 202[1:3] executes the sub-task at some point in time when it has the resources to process the task, and as a result, the time of execution may or may not overlap with other slave cores. As a result, it is possible for the assigned memory initialization/testing sub-tasks to be executed in serial fashion or in parallel by the cores 202, depending on the availability of resources on the slave cores. The sub-task execution can be performed by the processing node or by circuitry inside each processing node's north bridge.

As will be appreciated, the control and slave cores may reside on independent platform systems. In these implementations, the control core sends sub-tasks to each participating platform system so that one or more cores on that system can each process its assigned subtask(s). In this scenario, the execution may be done in serial or in parallel. As a result of the distributed nature of the memory initialization task execution, the fact that execution is done in parallel or serial is not relevant to the completion of the task. If the task is executed in parallel, the task may be completed faster, but the latency of transferring the data may result in a serialization at the control core.

At step 508, each processing node reports status back to the BSP. Status reporting can, for example, be continuous during the memory initialization and test, or can be periodic, or when memory initialization and testing are complete. Additionally, status reports can be reported in a variety of manners. For example, the boot strap processor can periodically send a query to each processing node to inquire if the assigned sub-tasks have been executed. Alternatively, each processing node can send a message which indicates its status to the boot strap processor. As another alternative, each processing node can write to local registers or even to the boot strap processor's local memory reporting status.

After all processing nodes have completed execution of their assigned memory initialization/testing sub-tasks, the boot strap processor continues with system boot and the other processing nodes halt, step 510. If a memory initialization/testing task is to be executed (affirmative outcome to decision 512), the process re-starts at step 504. Otherwise, the process ends at step 514.

By assigning memory initialization/testing sub-tasks to different processing nodes, system boot can complete significantly faster. Even though some sub-tasks depend on completion of previous sub-tasks and other tasks can be completed out of sequence without waiting for previous sub-tasks to be completed, the overall performance and startup time can be improved by dividing, assigning, and distributing sub-tasks without regard to tasks with dependencies and those without. This results from the fact that the overall "system boot" or "booting the system" time is reduced since some of the sub-tasks are executed by a first processing node without having to wait on tasks that appear before them in the execution order and on which they have no dependence executing before them. Of course, memory initialization may be further improved if the boot strap processor divides the memory initialization/testing task into sub-tasks by taking into account the individual dependencies for each sub-task. For example, one or more designated processing nodes could be assigned the sub-tasks which are dependent on the results of other sub-tasks, while one or more other designated processing nodes could be assigned the sub-tasks that can be completed out of sequence without waiting for previous sub-task(s) to be completed.

As described herein, the distributed memory initialization routine may be implemented with BIOS code which is able to configure, initialize, and test memory that is distributed among multiple nodes in a multiprocessor system by dividing the memory tasks for distribution and execution by separate nodes, resulting in improved execution times. For example, one core can be tasked with reading SPD from the SMBus (slow bus), while another core can execute complex initialization tasks that are not SPD dependent. The disclosed distributed processing approach can also improve the accuracy of certain BIOS algorithms. For example, training algorithms have been developed whereby the BIOS is optimized for faster execution, whereby a data eye is generated that can be used to determine the optimal placement of delay settings. However, the generated data eye is limited by the amount of data that can be processed by the core which executes the training algorithm. The distributed processing approach disclosed herein can be used to improve the accuracy by using the primary core to gather data and divide the data for distribution to the other cores in the system which process the information and return the results to the primary core. The disclosed divide-and-distribute scheme also results in faster boot times when assigned sub-tasks are executed out of order. Yet another possible benefit is that the processing cores may be used more efficiently during BIOS initialization by having sub-tasks distributed to each core, instead of having the boot strap processor perform all of the BIOS initialization tasks.

To provide a further example and explanation of how the memory initialization tasks may be divided and distributed across a plurality of processing nodes where the total number of sub-tasks st is less than or equal to the total number of cores in the system, reference is now made to the following memory initialization routine or algorithm:

T={st[1]+st[2]+st[3]+ . . . st[X]}, where st is a memory initialization sub-task;
C0=main initialization core responsible for combining "st" to create "T";
c[n]=sub-task core where n={1 . . . N};
N=the max number of cores such that N≥X;
X=the max number of sub-tasks for any T;
n—current core number;
x—current sub-task number;
Step 1—Distribute sub-tasks to cores;
Step 2—For c[n];
Step 3—For st[x];
Step 4—send st[x] initialization information and code from c0 to c[n];
Step 5—c[n] begins execution of s[x];
Step 6—c0 receives st[x] results from c[n] and starts execution;
Step 7—c0 increments n and x;
Step 8—c0 repeats steps 2 to 7 for all X;
Step 9—Move to step 10 when n=N;
Step 10—c0 collects distributed sub-tasks data;
Step 11—For c[n];
Step 12—c0 requests st[x] data from c[n];
Step 13—c[n] completes execution and sends results to c0;
Step 14—c0 increments n and x;
Step 15—c0 repeats steps 11 to 14 for all X until all n=N;
Step 16—c0 generates T by re-combining the data from all st[1-X]
Step 17—All steps are repeated for the next Task.

As will be appreciated, the foregoing routine can be expressed in pseudo-code form and/or translated into corresponding assembly-language or high-level-language code for the particular instruction set architecture that they are using. In addition, the operations described herein can include directly entered commands by a computer system user and/or steps executed by software modules. The functionality of any step referred to herein may correspond to the functionality of modules or portions of modules. In addition to software modules, the above flows or portions of flows can be implemented as application instructions. The operations referred to herein may be modules or portions of modules (e.g., software, firmware, or hardware modules). For example, the software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention. Thus, the flows described herein, the operations thereof, and modules therefore may be executed on a computer system configured to execute the operations of the flows and/or may be executed from computer-readable media. The flows may be embodied in a machine-readable and/or computer-readable medium for configuring a computer system to execute the flows. Thus, the software modules may be stored within and/or transmitted to a computer system memory to configure the computer system to perform the functions of the module.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for causing a plurality of processing nodes to perform a boot process comprising a memory initialization task, comprising:
dividing a memory initialization task into a plurality of memory initialization sub-tasks;
distributing the plurality of memory initialization sub-tasks amongst the plurality of processing nodes so that each memory initialization sub-task has a corresponding processing node by assigning one of the plurality of processing nodes a memory initialization sub-task of reading a serial presence detect (SPD) value from a DIMM memory, and assigning another of the plurality of processing nodes a memory initialization sub-task of executing complex initialization tasks that do not depend on the SPD value;
receiving sub-task results from the plurality of processing nodes; and
combining sub-task results from the plurality of processing nodes.

2. The method of claim 1, further comprising initializing communication links between the plurality of processing nodes prior to distributing the plurality of memory initialization sub-tasks.

3. The method of claim 1, further comprising scheduling the respective memory initialization sub-task for execution at the respective processing node.

4. The method of claim 1, wherein each memory initialization sub-task includes a software routine.

5. The method of claim 1, wherein a first memory initialization sub-task of the plurality of memory initialization sub-tasks is distributed to a first processing node of the plurality of processing nodes, wherein a second memory initialization sub-task of the plurality of memory initialization sub-tasks is distributed to a second processing node of the plurality of processing nodes, and wherein the first memory initialization sub-task and the second memory initialization sub-task of the plurality of memory initialization sub-tasks are executed in parallel.

6. A non-transitory computer readable storage medium storing at least one program configured for execution by at least one processor of a computer system, the at least one program comprising instructions to:

divide a memory initialization task into a plurality of memory initialization sub-tasks;

distribute the plurality of memory initialization sub-tasks amongst the plurality of processing nodes so that each memory initialization sub-task has a corresponding processing node by assigning one of the plurality of processing nodes a memory initialization sub-task of reading a serial presence detect (SPD) value from a DIMM memory, and assigning another of the plurality of processing nodes a memory initialization sub-task of executing complex initialization tasks that do not depend on the SPD value;

receive sub-task results from the plurality of processing nodes; and combine sub-task results from the plurality of processing nodes.

7. The non-transitory computer readable storage medium of claim 6, wherein the at least one program comprises instructions to initialize communication links between the plurality of processing nodes prior to distributing the plurality of memory initialization sub-tasks.

8. The non-transitory computer readable storage medium of claim 6, wherein the instructions comprise instructions to schedule the respective memory initialization sub-task for execution at the respective processing node.

9. The non-transitory computer readable storage medium of claim 6, wherein each memory initialization sub-task includes a software routine.

10. The non-transitory computer readable storage medium of claim 6, wherein a first memory initialization sub-task of the plurality of memory initialization sub-tasks is distributed to a first processing node of the plurality of processing nodes, wherein a second memory initialization sub-task of the plurality of memory initialization sub-tasks is distributed to a second processing node of the plurality of processing nodes, and wherein the first memory initialization sub-task and the second memory initialization sub-task of the plurality of memory initialization sub-tasks are executed in parallel.

11. A method for causing a plurality of processing nodes to perform a boot process comprising a memory initialization task, comprising:

receiving a directed interrupt for a memory initialization sub-task from a processing node which generates the directed interrupt by writing one or more values to one or more registers, the memory initialization sub-task being one of a plurality of memory initialization sub-tasks that were generated by the processing node by dividing a memory initialization task;

obtaining information from a memory array while executing the memory initialization sub-task; and returning the results of the memory initialization sub-task to the processing node.

12. The method of claim 11, wherein the one or more values comprises:

a node identifier that identifies a target of the directed interrupt; and a vector that identifies a series of instructions that comprise the memory initialization sub-task.

13. The method of claim 11, wherein receiving the memory initialization sub-task comprises receiving a memory initialization sub-task of reading a serial presence detect (SPD) value from a DIMM memory.

14. The method of claim 11, wherein receiving the memory initialization sub-task comprises receiving a memory initialization sub-task of executing complex initialization tasks that do not require reading a serial presence detect (SPD) value from a DIMM memory.

15. A non-transitory computer readable storage medium storing at least one program configured for execution by at least one processor of a computer system, the at least one program comprising instructions to:

receive a directed interrupt for a memory initialization sub-task from a processing node which generates the directed interrupt by writing one or more values to one or more registers, the memory initialization sub-task being one of a plurality of memory initialization sub-tasks that were generated by the processing node by dividing a memory initialization task;

obtain information from a memory array while executing the memory initialization sub-task; and return the results of the memory initialization sub-task to the processing node.

16. The non-transitory computer readable storage medium of claim 15, wherein the one or more values comprise:

a node identifier that identifies a target of the directed interrupt; and a vector that identifies a series of instructions that comprise the memory initialization sub-task.

* * * * *